United States Patent [19]

Poss

[11] 4,215,450
[45] Aug. 5, 1980

[54] SKINNING MACHINE

[75] Inventor: Werner Poss, Oakville, Canada

[73] Assignee: Poss Design Limited, Hamilton, Canada

[21] Appl. No.: 956,248

[22] Filed: Oct. 31, 1978

[51] Int. Cl.² .......................... A22C 21/00; A22B 5/16
[52] U.S. Cl. ........................................ 17/11; 17/21; 17/50; 99/585
[58] Field of Search .......................... 17/11, 21, 50, 11; 99/585, 640

[56] References Cited

U.S. PATENT DOCUMENTS

| | | | |
|---|---|---|---|
| 2,477,289 | 7/1949 | De Moss | 17/21 |
| 2,527,303 | 10/1950 | Gaddie | 99/640 |
| 3,587,686 | 6/1971 | Dixon | 99/640 |
| 3,913,174 | 10/1975 | Paoli | 17/11 X |
| 3,930,283 | 1/1976 | Martin | 17/11 |

Primary Examiner—Willie G. Abercrombie
Attorney, Agent, or Firm—Hirons, Rogers & Scott

[57] ABSTRACT

In a skinning machine, intended primarily for deskinning poultry pieces, a cylindrical feed screw in a cylindrical passage forms an annular feed passage between them. The passage increases in flow capacity from a hopper at its entrance, where the pieces are received, to a skin removal station, and then decreases in flow capacity to its end. Skin removal means includes pairs of rollers mounted around the passage at the skin removal station to constitute part of the passage wall, each roller having a radially protruding rib that extends into the neighborhood of the surface of the other roller so as to grip the skin between them and strip it from the pieces. The rollers have a peripheral speed greater than the feed screw and part of the separated skin is passed between them out of a respective first exit. The machine includes a cylindrical knife edge barrier at the exit from the skin removal station that engages the pieces moving axially toward the piece exit and presses them back into contact with the skin removal rollers before they leave station. A second exit for the majority of the skin is formed by a gap between this barrier and the skin removal means. A gear train is provided to drive the slower rotating feed screw and the faster rotating skin removal rollers from the same motor.

13 Claims, 2 Drawing Figures

SKINNING MACHINE

FIELD OF THE INVENTION

The present invention is concerned with improvements in or relating to skinning machines, more particularly such machines that are intended for de-skinning poultry.

REVIEW OF THE PRIOR ART

A novelty search carried out prior to the preparation of this application in Class 17 (butchering), sub-classes 21 (skinners) and 50 (skinning processes) revealed as the earliest patent having any pertinence to this invention, U.S. Pat. No. 66,558, issued 9th July 1867 for a machine for stripping hides from cattle, the hides being engaged by hand between toothed longitudinal rollers which are then rotated to strip the hide from the carcass. Other patents noted as having some pertinence to this application are U.S. Pat. Nos. 2,620,510; 3,406,425 and 3,930,283.

U.S. Pat. No. 2,620,510 issued 9th Dec. 1952, relates to a poultry gizzard skinner wherin gizzards are moved by hand over a table into contact with a pair of parallel ridged rollers, each ridge of one roller engaging between two spaced ridges of the other roller. The ridges are notched and their surfaces roughened to feed the gizzard skin between the rollers so that it will be pulled from the meat.

U.S. Pat. No. 3,406,425 issued 22nd Oct. 1968 also discloses a poultry gizzard skinner in which gizzards and stomachs are fed by a conveyor onto a ribbed roller and thereafter the two are separated by a hydraulic pusher, the gizzard being fed onto two meshing helically-toothed rollers which remove the gizzard skin or lining.

U.S. Pat. No. 3,930,283 issued 6th Jan. 1976 is concerned with a machine for removing skin from poultry pieces in substantially intact condition. The machine comprises a hopper from which the pieces are fed onto the adjacent ends of two pairs of closely spaced rollers arranged with their axes in the same horizontal plane. All the rollers are helically ribbed, and the two outer rollers have a coarser pitch than the two inner rollers, and the rollers are closer together at the ends remote from the feeding hopper; the rollers of each pair rotate in opposite directions. The poultry pieces are distributed over the rollers by a paddle wheel and engage rotatable slitting knives to slit the skin, which is then gripped by the rollers and pulled from the pieces.

There is a continuing large market for poultry sections, the carcass being pre-separated into different pieces. The backs and necks cannot usually be sold as such, and are processed mechanically to remove as much as possible of the meat, which can then be used for soups, pies, sausages, etc. The skin is not usually considered a desirable part of the meat and preferably is separated before this processing takes place. In many jurisdictions there is now an official limit as to the proportion of skin that can be present in such mechanically processed meats. Such removal must be done mechanically, since hand removal would be prohibitive in cost, so that valuable meat products would have to be discarded.

DEFINITION OF THE INVENTION

It is therefore an object of the invention to provide a new machine for de-skinning poultry pieces.

It is a more specific object to provide such a machine able to remove skin from poultry pieces on a continuous basis.

In accordance with the present invention there is provided a skinning machine for removing skin from poultry pieces fed thereto comprising:

a frame providing a feed passage having a cylindrical radially outer passage wall;

a cylindrical feed screw mounted in the passage by the frame for rotation about a respective longitudinal axis and forming between itself and the said passage wall an annular feed passage having an entrance thereto for pieces to be de-skinned, an exit therefrom for the de-skinned pieces and another exit therefrom at a skin removal station for removed skin;

means for rotating the feed screw about the said longitudinal axis thereof;

skin removal means comprising a plurality of skin gripping means mounted by the frame around the circumference of the feed screw at the skin removal station to grip skin on the pieces moving in the passage and strip it so that it can pass through the said another exit therefor;

a cylindrical barrier member mounted by the frame at the outlet from the skin removal station, the said barrier member engaging the pieces moving toward the de-skinned piece exit and pressing them into engagement with the skin removal means.

Preferably the said skin removal means comprises pairs of roller members mounted for rotation about longitudinal axes parallel to the screw longitudinal axis, the two rollers of each pair being closely adjacent to one another to grip skin between them and strip it from the pieces.

The machine may include a cylindrical member mounted by the frame and providing a circular knife edge in the flow passage at the outlet along the passage from the skin removal station, the said edge engaging the pieces moving toward the de-skinned piece exit and pressing them into engagement with the skin removal means.

DESCRIPTION OF THE DRAWINGS

A skinning machine which is a particular preferred embodiment of the invention will now be described, by way of example, with reference to the accompanying diagrammatic drawings, wherein.

DESCRIPTION OF THE PREFERRED EMBODIMENTS

Figure 1:
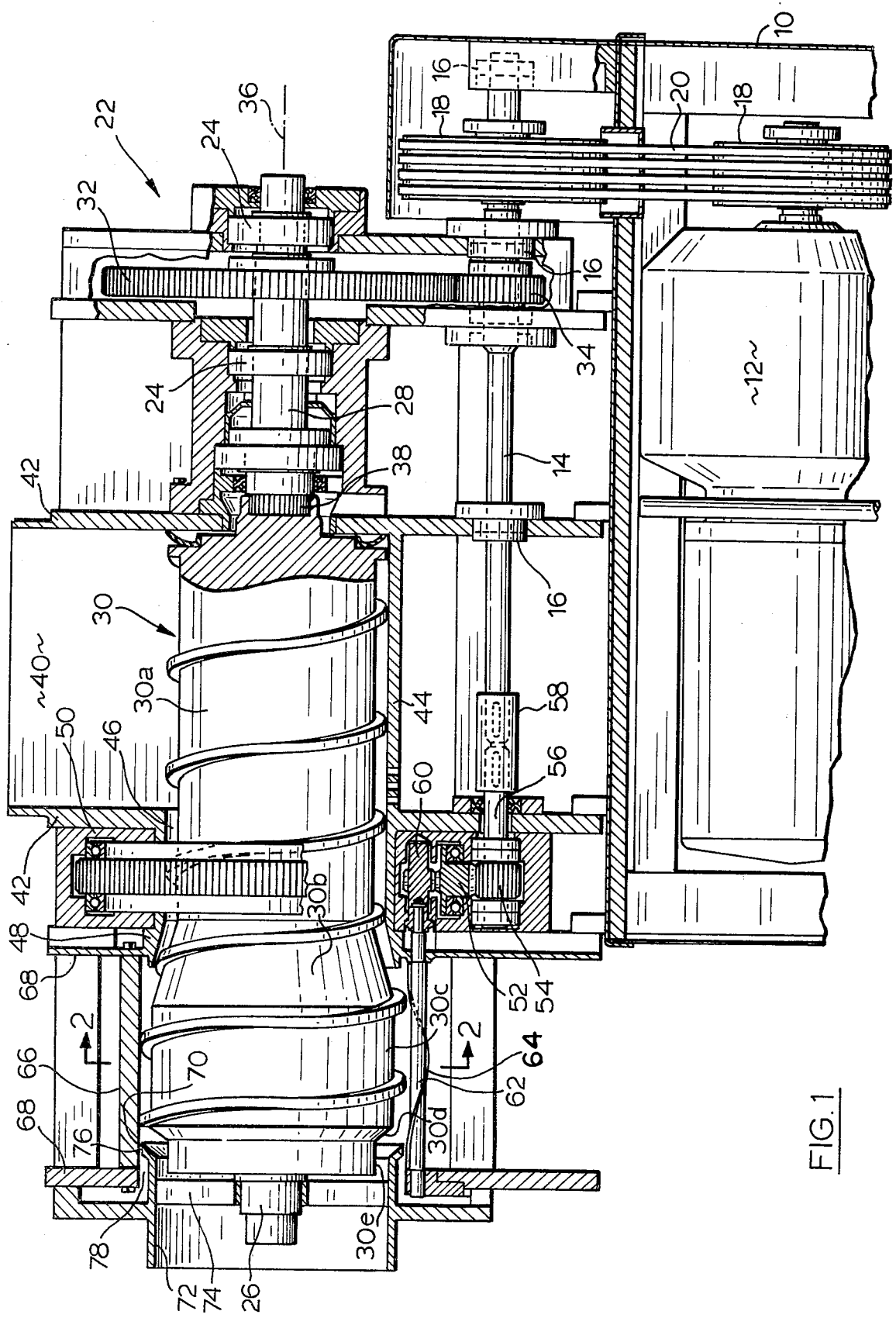
FIG. 1 is a longitudinal cross section taken generally on the line 1—1 of FIG. 2.
Figure 2:
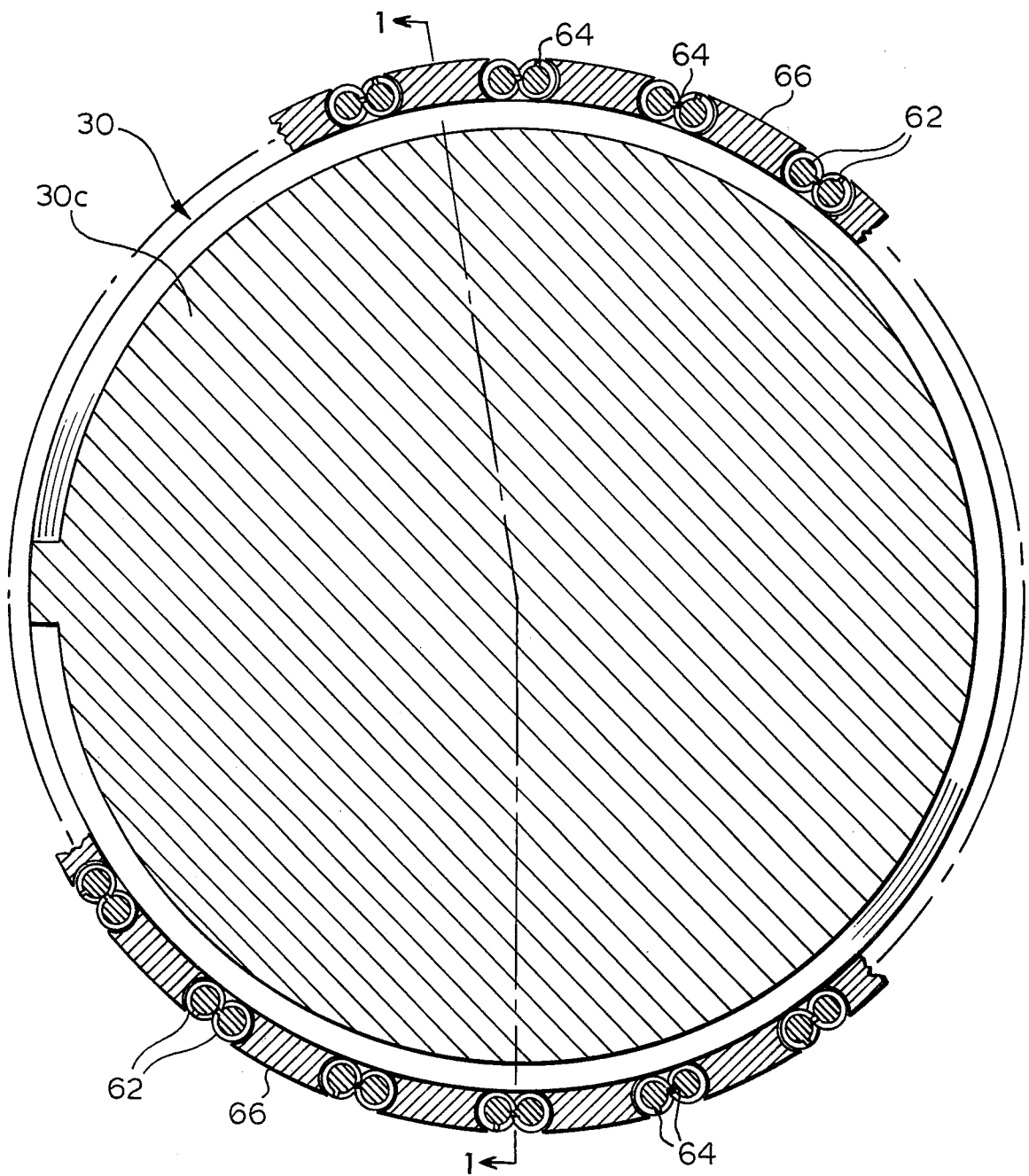
FIG. 2 is a transverse cross-section taken on the line 2—2 of FIG. 1.

The machine comprises a rigid base 10 in which is mounted an electric motor 12, arranged to rotate a high speed lay shaft 14 mounted in bearings 16, the drive being by means of pulleys 18 and connecting drive belts 20. A body or frame 22 is mounted on the base 10 and carries the bearings 16, this body or frame also mounting for rotation, by means of bearings 24 and 26 respectively, a slow-speed drive shaft 28 and a helical feed screw 30. The machine also includes various members such as seals, thrust bearings, bearing supports etc., that are so common in the art as not to require further detailed explanation herein.

The slow-speed shaft 28 is driven from the lay shaft 14 at a substantially slower speed by means of meshing large spur gear 32 and smaller gear 34 on the respective shafts, while the feed screw 30 is driven from the shaft 28 for rotation about its longitudinal axis 36 via a disengageable splined connection 38. The feed screw has a "receiving" portion 30a, which is of uniform diameter along its length, followed in succession by a "connecting" portion 30c also of uniform diameter, a "discharge" portion 30d of uniformly decreasing diameter and a "terminal ejecting" portion 30e of uniform diameter. Separate motors can instead be used for the two shafts if more independent control of their speeds is required. The major part of the beginning portion of screw portion 30a is enclosed by a receiving hopper 40 formed between two transverse partition walls 42 and a U-shaped wall 44, the wall 44 closely surrounding the lower half of the screw circumference, while the remainder of the screw portion 30a extends through a passage 46 of circular cross-section and uniform diameter formed in frame part 48, so that the screw and the passage 46 form between themselves an annular passage of uniform flow capacity along its length. The continuation of this annular passage is of uniformly progressively increasing diameter to correspond with the increasing diameter of screw part 30b, so that the passage remains of uniform radial width, while its flow capacity will increase because of increasing diameters.

The part 50 of the machine frame surrounding the said remainder of the screw portion 30a mounts for rotation an internally and externally toothed ring gear 52, the external teeth of which mesh with a spur gear 54 mounted on a stub shaft 56 connected by coupling 58 to high speed shaft 14 and rotated thereby. The internal teeth of ring gear 52 mesh with a plurality of spur gears 60 each of which is an extension of a respective elongated chicken skinning roller member 62. Each of these members takes the form of an elongated rod having a helical protruding rib 64 formed on its exterior cylindrical surface and having the respective gear 60 fixed to one end, so that they rotate together. The members are arranged in pairs with the two members of each pair so closely spaced together that their ribs intermesh with one another and almost touch the surface of the other roller. The pitch angle of the ribs can be about 27° to 35° and each extends from one end of the roller to the other with approximately a single complete turn. The pairs effectively form part of the outer cylindrical passage wall and are spaced from one another, the gap between immediately adjacent pairs being filled by an arcuate-shaped bar 66 bolted to partitions 68 of the frame part 48 that define the exit for the separated skin that passes through the roller members. As an indication of the relative size and spacing of the roller members 62, a specific machine with a screw portion 30c of 40 cm diameter and four pairs of roller members 62 each of about 2.5 cm diameter. The roller pairs are illustrated as uniformly spaced about the circumference of the feed screw, but they may instead be grouped in a specific configuration, so that the corresponding first exit or exits for removed skin occur at desired locations.

The discharge portion 30d of the feed screw decreases rapidly in diameter to the terminal portion 30e, the junction of portions 30c and 30d being surrounded by a cylindrical barrier 70 formed by a tubular member 72 carrying a spider 74 supporting the adjacent bearing 26. The barrier member presents a tapered knife edge to the advancing pieces with its outer circumference spaced between about 0.12 to 0.30 cm from the inner circumference of the roller members 62 and the bars 66, thus providing an annular gap 76 through which separated skin can pass to a corresponding second exit 78 around the outer circumference of the tubular member 72. The de-skinned meat pieces are fed out of the machine through the respective exit between the feed screw portions 30d and 30e and the tubular member inner circumference.

Chicken pieces to be de-skinned are deposited in the hopper 40 and are fed by the screw into contact with the skin removal means constituted by the pairs of rotating ribbed roller members 62, each pair of which constitutes an individual skin gripping means. As the chicken pieces are moved axially by the feed screw they are pressed only lightly radially against the skin removal means, since the pressure under which they are fed through this part of the passage has been relieved somewhat, because of the small but definite increase in its flow capacity. As the surfaces of the pieces are engaged by the skin removal members relatively loosely attached material such as the skin is gripped by them and torn from the remainder of the pieces. A small proportion of the separated skin is ejected radially from the machine through the roller members, but the majority passes through the gap 76 and exit 78 by the advancing motion of the feed screw and the skin removal means.

The motion provided by the apparatus to present the pieces to the skin gripping means is highly effective in that they are confined in a passage, are moved axially in the passage along and against the gripping roller members constituting part of the wall passage by the feed screw, and at the same time are rolled in the passage by the relative rotations between the feed screw and the roller members, so that the entire surface of each piece is presented for the skin removal action of the gripping roller members. The ratios provided by the gears 32, 34, 52, 54 and 60 are such that the roller members 62 rotate with a much higher peripheral speed than the feed screw portion 30a, for example in the ratio from 12 to 1 to 3 to 1. As mentioned above the feed screw and the skin removal means can be driven independently of one another for easier adjustment of this ratio. The barrier member functions to press the pieces back toward the skin removal station, and the knife edge 70 is operative to move the relatively loosely attached skin back into contact with the skin removal roller members 62, so that it is removed and passes out of the two available skin exits.

Although specific machine constructions have been particularly described it will be understood by those skilled in the art that considerable modifications and changes are possible while remaining within the scope of the invention as presented by the following claims.

What is claimed is:

1. A skinning machine for removing skin from poultry pieces fed thereto comprising:
 a frame providing a feed passage having a cylindrical radially outer passage wall;
 a cylindrical feed screw mounted in the passage by the frame for rotation about a respective longitudinal axis and forming between itself and the said passage wall an annular feed passage having an entrance thereto for pieces to be de-skinned, an exit therefrom for the de-skinned pieces and another exit therefrom at a skin removal station for removed skin;

means for rotating the feed screw about the said longitudinal axis thereof;

skin removal means comprising a plurality of skin gripping means mounted by the frame around the circumference of the feed screw at the skin removal station to grip skin on the pieces moving in the passage and strip it therefrom so that it can pass through the said another exit therefor;

and a cylindrical barrier member mounted by the frame at the outlet from the skin removal station, the said barrier member engaging the pieces moving toward the de-skinned piece exit and pressing them into engagement with the skin removal means.

2. A machine as claimed in claim 1, wherein the said skin removal means comprises pairs of roller members mounted for rotation about longitudinal axes parallel to the screw longitudinal axis, the two rollers of each pair being closely adjacent to one another to grip skin between them and strip it from the pieces.

3. A machine as claimed in claim 2, wherein each roller member is provided with a respective helical protruding rib extending along its length and also extending into the neighbourhood of the surface of the other roller member of the pair, so that skin is gripped between the rib of one member and the surface of the other member.

4. A machine as claimed in claim 2, including means for rotating said roller members simultaneously about their respective longitudinal axes, and gear means connecting said rotating means for the feed screw and the rotating means for the roller members.

5. A machine as claimed in claim 4, wherein said gear means comprise a drive shaft to which the feed screw is connected to be driven thereby and carrying a drive shaft spur gear, a lay shaft mounted by the frame and having a lay spur gear engaged with the drive spur gear, means for rotating the lay shaft, and an internally and externally toothed ring gear mounted by the frame, having its external gear teeth meshing with a spur gear on the lay shaft to be rotated thereby, and having its internal gear teeth engaged by respective spur gears of the roller members.

6. A machine as claimed in claim 1, wherein the said feed passage increases in flow capacity from the said entrance thereto to the said skin removal station.

7. A machine as claimed in claim 6, wherein the said feed passage decreases in flow capacity from the said skin removal station to the said exit for the de-skinned pieces.

8. A machine as claimed in claim 1, wherein the said barrier member is tapered to present a circular knife edge to the pieces moving toward the de-skinned piece exit.

9. A machine as claimed in claim 1, wherein the said skin removal means constitute a first exit for removed skin which passes through the said means, and there is provided a second exit for removed skin constituted by an annular gap between the skin removal means and the radially outer cylindrical surface of the cylindrical barrier member.

10. A machine as claimed in claim 2, wherein the said barrier member is tapered to present a circular knife edge to the pieces moving toward the de-skinned piece exit.

11. A machine as claimed in claim 2, wherein the said skin removal means constitute a first exit for removed skin which passes through the said means, and there is provided a second exit for removed skin constituted by an annular gap between the skin removal means and the radially outer cylindrical surface of the cylindrical barrier member.

12. A machine as claimed in claim 1, wherein the said feed passage is of substantially constant flow capacity at the said entrance thereto, is of progressively increasing flow capacity from said entrance to the skin removal station, is of substantially constant flow capacity at the skin removal station, and is of decreasing flow capacity from the skin removal station to the piece exit.

13. A machine as claimed in claim 12, wherein said feed screw is of substantially constant diameter at the said flow passage entrance, is of progressively increasing diameter from said entrance to the skin removal station, is of substantially constant diameter at the skin removal station, and is of decreasing diameter from the skin removal station to the piece exit.

* * * * *